Oct. 28, 1924.
T. SLOPER
MANUFACTURE OF TIRES
Filed Aug. 8, 1922
1,513,434
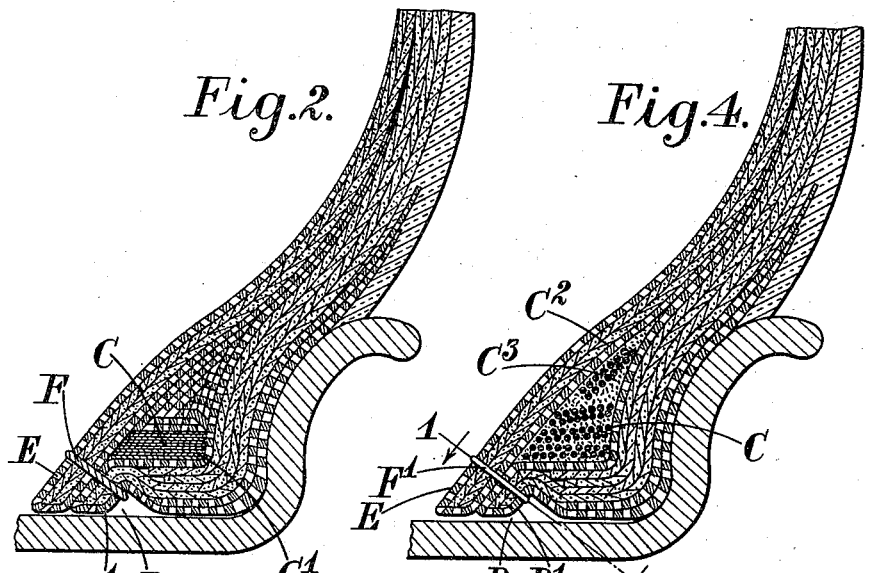
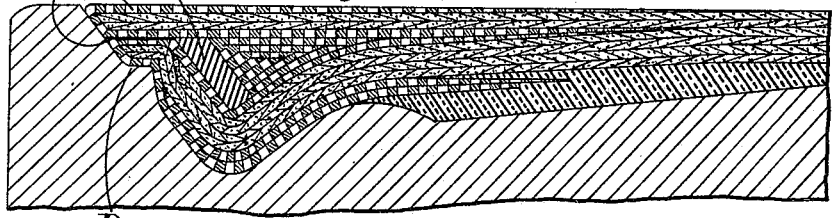
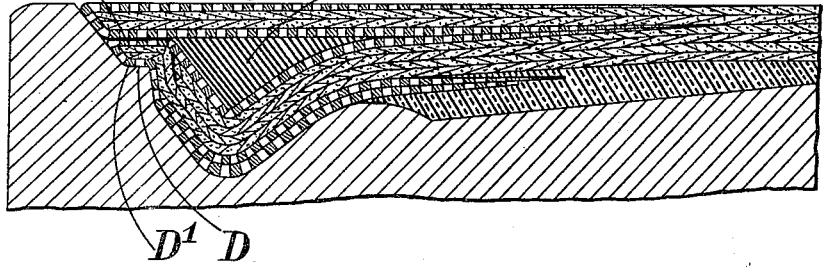

Patented Oct. 28, 1924.

1,513,434

UNITED STATES PATENT OFFICE.

THOMAS SLOPER, OF DEVIZES, ENGLAND.

MANUFACTURE OF TIRES.

Application filed August 8, 1922. Serial No. 580,434.

*To all whom it may concern:*

Be it known that I, THOMAS SLOPER, a subject of the King of England, residing at Devizes, Wiltshire, in England, have invented certain new and useful Improvements in the Manufacture of Tires, of which the following is a specification.

This invention is for improvements in or relating to the manufacture of pneumatic tire-covers and has for its object to provide a process of manufacture whereby a tire-cover made in the "flat" or endless band form, and which when finished is provided in each edge with an annular channel containing a metal inextensible ring, can be removed from the mould whereon it is vulcanized without having to collapse the mould, and can be altered in shape to that of a pneumatic tire-cover whilst maintaining the channels in such form that the rings in the finished tire shall lie in the proper positions therein and shall not be distorted.

If a tire-cover is made and vulcanized in the "flat" form with permanent inextensible rings or wires in its edges it cannot be removed from the mould without collapsing the latter, and subsequent shaping of the tire twists and distorts the inextensible rings so that they do not take their proper position in the finished tire.

The process for manufacturing pneumatic tire-covers having inextensible edges according to this invention, consists in (*a*) building into each edge-portion of the tire-band, whilst it is in the "flat" form, a removable core to fill the required channel composed of a ductile material, for example lead, which is such that the circumferential dimensions of the core can be changed and/or the core deformed for the purpose hereinafter described, the channel being only provisionally closed along one side so that it can be afterwards opened to remove the core; (*b*) removing the said core after vulcanization on the mould; (*c*) substituting therefor an inextensible ring which is to remain permanently in the tire, and (*d*) permanently closing the sides of the channel to retain the inextensible ring therein.

After the permanent inextensible ring has been introduced the open sides of the channel can be sealed together by stitching or the like, with or without further vulcanization, and to enable the stitching or like process to be carried out an annular recess may be provided at the edge of the cover in the outer surface to receive the operative part of the stitching or like machine so that the stitches or the like can extend from the inner face of the tire into the said recess.

A further feature of this invention consists in providing an inextensible ring for insertion in the edge portion of a tire, which inextensible ring is composed of a strip of metal, such as a steel band, wound upon itself and secured against unwinding by any suitable means.

The invention is more particularly described with reference to the accompanying drawings, in which—

Figure 1 shows a section of the edge of a tire-band provided with a removable core of lead or other suitable material;

Figure 2 is a section of the edge of a tire-band in which the removable core has been replaced by an inextensible ring and the open sides of the channel sealed by stitching;

Figure 3 is a section of the edge of a tire-band in which the removable core is of approximately triangular cross-section;

Figure 4 is a section of the edge of a tire-band in which the removable core in Figure 3 has been removed and replaced by an inextensible ring, the open sides of the channel being sealed by staples, and Figure 5 shows a section of the edge of a tire-band along the line 1—1, Figure 4.

Like reference-letters indicate like parts throughout the drawings.

The tire-band is made up in the "flat" in the usual manner except that the channel for the reception of the inextensible ring is filled by a core A (Figures 1 and 3) of ductile material and the open sides, indicated by the line B in the single channel shown, are separated by a material which will not vulcanize so as to permit of access to the channels after the tire has been shaped.

If a separating piece of material is inserted in this manner the side will definitely remain open, but it will be appreciated that the arrangement might be such that the side should be temporarily closed in such manner that it can be easily ripped apart and for the purpose of this invention this would be considered an open side.

When the tire-band has been made up and the tire has been pressed and vulcanized, the core A is replaced by a permanent inextensible ring C (Figures 2 and 4) of similar shape to the core A and the material for preventing the vulcanization of the open sides of the channel is removed.

Whilst the tire-band is being made up and during the subsequent pressing and vulcanization of the tire, the core A substantially retains its original shape and does not become distorted as would be the case with an inextensible ring.

By the term ductile is to be understood any material which will deform in the manner required without losing its general form. In other words, it must be such a material as can be compressed in a circumferential direction or in a radial direction without distorting it out of its circular shape; such materials as lead, copper and even mild-steel may be used, although mild-steel is not desirable because it tends to bruise the fabric of the band. Also a composition of rubber and canvas wherein there is a preponderance of canvas fulfills the requirements.

After the core A has been replaced by the inextensible ring C the open sides of the channels are sealed in any suitable manner, for example by stitching, riveting, stapling or the like with or without vulcanization.

To receive the stitching or the like there is provided on the external surface of each tire-bead an annular recess D which has one of its faces parallel to the inner face E of the tire. This recess provides a surface D¹ which receives the operative part of the stitching or like machine used for sealing the open edges of the tire-band, the stitches or the like extending from the inner face of the tire into the recess D, one of said stitches being indicated by the letter F (Figure 2) and a staple indicated by the letter F¹ (Figures 4 and 5).

The inextensible ring C (Figure 2) is composed of a steel band C¹ wound upon itself and secured against unwinding by any suitable means.

The inextensible ring C (Figure 4) may comprise any suitable inextensible members C² secured in a requisite packing material C³.

Generally the cross-section of the removable cores differs slightly from that of the permanent inextensible rings, due to the fact that the channels alter in shape during the process of shaping the tire from the flat band to its proper tire shape.

If an inextensible ring of special cross-section is required, the elements comprising the same can be shaped accordingly, for example with the steel band C¹ illustrated in Figure 2 it can have one side sloped towards the other so that an inextensible ring is provided whose cross-sectional shape resembles an oblong form with one side bevelled off.

It will be appreciated that the deformable cores A, which are provisionally inserted in the channels in the tire-band, enable the tire-band to be removed from the mould, whereon it is vulcanized, without collapsing the mould, as the circumferential dimensions of the core can be slightly increased for removal purposes. On the other hand, those same cores can be decreased circumferentially during the pressing of the band on the mould, and after vulcanization they can be deformed during the shaping process without seriously affecting the shape of the channels in which they lie, so that these subsequently will, without difficulty, receive the permanent inextensible rings C.

In some cases it may not be necessary to retain the deformable cores in the channels during shaping, but these may be left temporarily empty, or again, if temporary cores of circular cross-section are used, these may be removed before shaping and the final inextensible ring, also of circular cross-section, introduced, as these do not get out of place during the shaping operation.

The invention is particularly applicable to the manufacture by the "flat" process of what are known as straight-sided tires which have inextensible rings or wires in their edges.

What I claim as my invention and desire to secure by Letters Patent is:—

1. A process for the manufacture of pneumatic tire-covers having inextensible rings which consists of the following steps: (a) building into each edge portion of the tire-band whilst it is in the flat form, a removable core to fill the required channel, composed of a ductile material which is such that the circumferential dimensions of the core can be changed and the core deformed, the channel being only provisionally closed along one side so that it can be afterwards opened to remove the core; (b) removing the said core after vulcanization on the mould; (c) substituting therefor an inextensible ring which is to remain permanently in the tire; and (d) permanently closing the sides of the channel to retain the inextensible ring therein.

2. A process for the manufacture of pneumatic tire-covers having inextensible rings which comprises the following steps; (a) building up a tire-band in the flat form with a channel in each edge-portion and an annular recess formed in the outer face of the outer side wall of each channel, and filling each channel, whilst the tire-band is in the flat form, with a removable core composed of a ductile material which is such that the circumferential dimensions of the core can be changed and the core deformed, each channel being only provisionally closed along its recessed side so that it can be afterwards opened to remove the core; (*b*) removing the said core after vulcanization on the mould; (*c*) substituting therefor an inextensible ring which is to remain permanently in the tire, and (*d*) permanently closing the sides of each channel by fastening means extending from the adjacent annular recess to and through that face of the tire-band which will be the inner face of the tire.

In testimony whereof I affix my signature.

THOMAS SLOPER.